US008765870B2

(12) United States Patent
Yamaguchi et al.

(10) Patent No.: US 8,765,870 B2
(45) Date of Patent: Jul. 1, 2014

(54) DILUENT FOR A FLOURINE-CONTAINING SILICONE COATING AGENT

(75) Inventors: Koichi Yamaguchi, Takasaki (JP); Hirofumi Kishita, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 796 days.

(21) Appl. No.: 12/003,161

(22) Filed: Dec. 20, 2007

(65) Prior Publication Data
US 2008/0257217 A1    Oct. 23, 2008

(30) Foreign Application Priority Data

Dec. 26, 2006    (JP) ................. 2006-349704

(51) Int. Cl.
*C08L 83/00* (2006.01)
*C09D 7/00* (2006.01)
*C09D 183/00* (2006.01)

(52) U.S. Cl.
CPC .............. *C09D 7/001* (2013.01); *C09D 183/00* (2013.01); *C08L 83/00* (2013.01)
USPC ................. 524/588; 524/15; 524/14; 524/31; 524/32; 524/42; 524/37; 524/33; 428/447; 428/451; 428/450; 428/421

(58) Field of Classification Search
None
See application file for complete search history.

(56) References Cited

U.S. PATENT DOCUMENTS

| 4,736,048 A | 4/1988 | Brown et al. |
| 4,842,902 A | 6/1989 | Brown et al. |
| 4,889,753 A | 12/1989 | Brown et al. |
| 4,985,526 A * | 1/1991 | Kishita et al. ................ 528/15 |
| 5,356,719 A * | 10/1994 | Hamada et al. ............... 428/447 |
| 2004/0186225 A1 * | 9/2004 | Yamaguchi ................... 524/588 |
| 2006/0276648 A1 * | 12/2006 | Yamaguchi ................... 544/357 |

FOREIGN PATENT DOCUMENTS

| EP | 0608780 A2 | 8/1994 |
| EP | 0655483 A1 | 5/1995 |
| JP | 63-320 A | 1/1988 |
| JP | 64-74268 A | 3/1989 |
| JP | 07-018185 A | 1/1995 |

OTHER PUBLICATIONS

European Search Report for corresponding EP-1944341-A3 dated Jul. 24, 2009.

* cited by examiner

*Primary Examiner* — Melvin C Mayes
*Assistant Examiner* — Smita Patel
(74) *Attorney, Agent, or Firm* — Birch, Stewart, Kolasch & Birch, LLP

(57) ABSTRACT

A diluent for a fluorine-containing silicone coating agent, said diluent comprising
(A) at least one selected from diisopropyl ether and hexane, and
(B) a fluorinated solvent having a boiling point, at atmospheric pressure, which is higher than that of the component (A) by at least 30° C. and is 180° C. or lower, with a weight ratio of the component (A) to the component (B) ranging from 95/5 to 50/50.

13 Claims, No Drawings

DILUENT FOR A FLOURINE-CONTAINING SILICONE COATING AGENT

CROSS REFERENCE

This application claims benefit of Japanese Patent application No. 2006-349704 filed on Dec. 26, 2006, the contents of which are hereby incorporated by reference.

FIELD OF THE INVENTION

The present invention relates to a diluent for a fluorine-containing silicone coating agent and a method for applying the same uniformly without causing craters or fish-eyes to from in the applied coating.

BACKGROUND OF THE INVENTION

To prevent a pressure-sensitive adhesive from firmly adhering to a substrate such as paper and plastic film, a surface of the substrate is coated with a silicone coating agent which is then cured to make a release layer on the substrate. A silicone pressure-sensitive adhesive mainly composed of an organopolysiloxane is widely used because a release layer thereof has good resistance to heat, coldness, and chemicals, good electric insulation and safety. The silicone pressure-sensitive adhesive has strong adhesion to a substrate, so that a silicone coating agent forming a good release layer should be used.

Such silicone coating agents are known, for example, a composition comprising an organopolysiloxane having a fluorine-containing substituent of the formula, $C_nF_{2n+1}CH_2CH_2$—, wherein n is an integer of 1 or larger, from Japanese Patent Publication of Examined Application No. 5-7434, and a composition comprising an organopolysiloxane having a fluorine-containing substituent of the formula, $[CF(CF_3)CF_2O]_nCF(CF_3)CF_2OCH_2CH_2CH_2$—, wherein n is an integer of from 1 to 5, from Japanese Patent Publication of Examined Application No. 4-76391. To apply these compositions, one has to dilute them with a diluent which preferably is a fluorinated solvent because of good solubility.

However, fluorinated solvents are expensive and have harmful effects on environment when they diffuse in the air. For these reasons, non-fluorinated solvents such as petroleum benzene, isooctane, hexane and diisopropyl ether are used as described in Japanese Patent Application Laid-Open No. 7-18185.

SUMMARY OF THE INVENTION

However, when the aforesaid fluorine-containing composition diluted with these solvents was applied to a substrate, there was found unevenness in thickness and craters or fish-eyes in the applied coating.

The object of the present invention therefore is to provide a diluent for a fluorine-containing silicone coating agent and a method of applying the agent without causing the above problem.

The present inventors have found that a uniform coating layer can be obtained by a combinatory use of a fluorinated solvent having a boiling point in a specific temperature range with a non-fluorinated solvent. Thus, the present invention is a diluent for a fluorine-containing silicone coating agent, said diluent comprising (A) at least one selected from diisopropyl ether and hexane, and (B) a fluorinated solvent having a boiling point, at atmospheric pressure, which is higher than that of the component (A) by at least 30° C. and is 180° C. or lower, with a weight ratio of the component (A) to the component (B) ranging from 95/5 to 50/50.

By using the diluent of the present invention, one can form a coating layer which has no pinholes or fish-eyes, and excellent release property.

PREFERRED EMBODIMENTS OF THE INVENTION

The diluent of the present invention comprises a combination of (A) at least one selected from diisopropyl ether and hexane and (B) a fluorinated solvent having a boiling point, at atmospheric pressure, higher than that of the component (A) by at least 30° C., preferably by at least 40° C. Because of the boiling points, the component (B) which is good solvent remains after the component (A) evaporates to prevent fish-eyes or craters from occurring in a coating layer. With less than 30° C. difference in boiling points between the component (A) and (B), it may be difficult to obtain a uniform coating layer of a fluorine-containing silicone.

Diisopropyl ether has a boiling point of from about 68 to 69° C. which is about the same as that of hexane. Accordingly, the fluorinated solvent (B) has a boiling point of 98° C. or higher, preferably 108° C. or higher, and of 180° C. or lower, preferably of 150° C. or lower. A fluorinated solvent having a boiling point higher than 180° C. is difficult to evaporate, resulting in poor productivity of coating layer.

Examples of the fluorinated solvent include fully fluorinated solvents such as perfluoroheptane, perfluorooctane, perfluorononane, and perfluoro-2-butyltetrahydrofuran; and partially fluorinated solvent such as hexafluoroxylene and benzotrifluoride. Preferred are perfluorooctane, perfluoro-2-butyltetrahydrofuran and hexafluoroxylene because of their lower prices, dissolving strength and good availability.

A weight ratio of the component (A) to the component (B), hereinafter referred to as (A)/(B), ranges from 85/15 to 65/35. With a mixture having (A)/(B) larger than 85/15, a uniform coating layer may not be obtained, whereas a mixture having (A)/(B) below 65/35 is expensive and not environmentally good. When the component (A) is a mixture of diisopropyl and hexane, any mixing ratio of diisopropyl to hexane can be employed.

The diluent of the present invention is used in such an amount that a concentration of a fluorine-containing silicone coating agent, as a solid content, of from 0.1 to 80 wt %, preferably from 1 to 20 wt %. If the concentration of the coating agent is less than the aforesaid lower limit, a coating layer having a sufficient thickness may not be obtained. If the concentration of the coating agent is higher than the aforesaid upper limit, a coating layer having a uniform thickness may not be obtained. When a coating composition is prepared in advance by mixing the diluent with a fluorine-containing silicone coating agent, the diluent is used in such an amount that the solid content of the composition ranges from 20 to 99.9 wt %, preferably from 80 to 99 wt %.

In the present invention, various kinds of fluorine-containing silicone coating agents can be used. Here, the term "agent" means film-forming ingredient or ingredients including a catalyst which constitutes or constitute a coating layer.

Preferably the coating agent comprises (i) a fluorine-containing organosiloxane which has at least two unsaturated groups per molecule and contains 20 to 40 wt % of fluorine atoms, based on weight of the fluorine-containing organosiloxane, (ii) an organohydrogenpolysiloxane having at least three SiH bonds per molecule, and (iii) a catalyst comprising a platinum group metal.

Preferably, the fluorine-containing organosiloxane (i) is represented by the following formula:

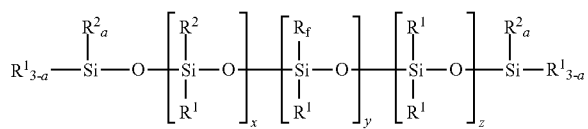

wherein $R^2$ is an alkenyl group having 2 to 10 carbon atoms such as vinyl, allyl, and hexenyl groups. $R^1$ is a non-substituted or substituted monovalent hydrocarbon group having 1 to 10 carbon atoms except aliphatic unsaturated groups. Example of $R^1$ include alkyl groups such as methyl, ethyl, propyl and butyl group; cycloalkyl groups such as cyclohexyl group; aryl groups such as phenyl and tolyl groups; and hydroxyl- or cyano-substituted groups thereof such as hydroxypropyl and cyanoethyl groups. In the above formula, a is 1, 2 or 3, x is an integer of 0 or larger, y is an integer of 1 or larger, and z is an integer of 0 or larger.

$R_f$ is at least one group selected from the groups represented by the following formulas (1) to (6):

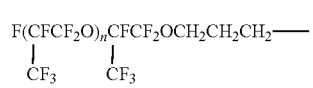 (1)

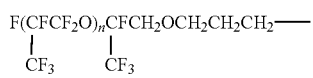 (2)

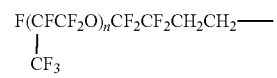 (3)

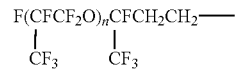 (4)

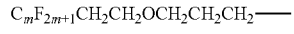 (5)

 (6)

wherein n is an integer of from 1 to 5, and m is an integer of from 3 to 10.

The fluorine-containing organosiloxane (i) may have a linear or branched structure and examples thereof include those represented by the following formulas.

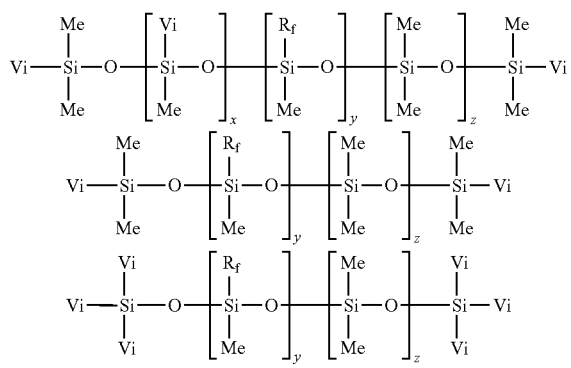

wherein Me represents methyl group, Vi represents vinyl group, and Rf, x, y, and z are as defined above.

The organohydrogenpolysiloxane (ii) has at least three SiH bonds per molecule which react with the alkenyl group of the component (i) to form a cured coating layer. The organohydrogenpolysiloxane (ii) preferably has a fluorine content of 40 wt % or lower in order for it to be miscible with the component (i).

The organohydrogenpolysiloxane (ii) may have a linear, branched or cyclic structure. A preferred organohydrogenpolysiloxane (ii) is represented by the following formula:

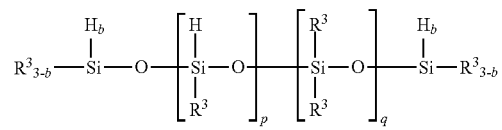

wherein $R^3$ is at least one selected from the groups listed above for $R^1$ and $R_f$, b is 0 or 1, p is an integer of 1 or larger, and q is an integer of 0 or larger, provided that p+2b is 3 or larger.

Specific examples of the organohydrogenpolysiloxane of the above formula are those represented by the following formulas:

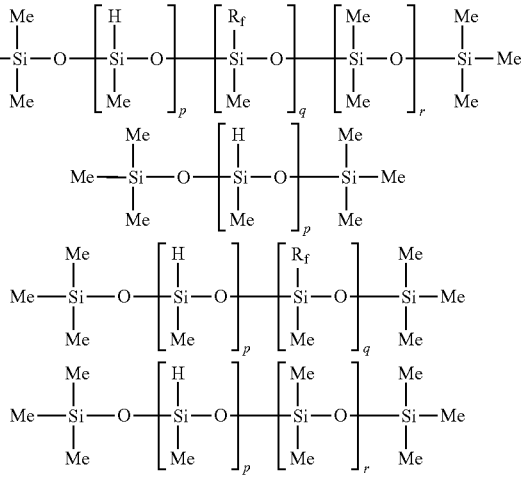

wherein Me, $R_f$, p and q are as defined above, and r is an integer of 1 or larger.

The organohydrogenpolysiloxane (ii) is contained preferably in an amount of from 0.1 to 20 parts by weight, particularly from 0.2 to 10 parts by weight per 100 parts by weight of the component (i). If the organohydrogenpolysiloxane (ii) is contained in an amount outside the aforesaid range, curing capability may be worse or a cured product may have unsatisfactory properties.

The catalyst comprising platinum group metal (iii) is to promote the addition reaction between the components (i) and (ii). Any known catalyst for the reaction can be used, for example, platinum catalyst, palladium catalyst and rhodium catalyst, among which platinum catalyst is preferred. Examples of the platinum catalyst include chloroplatinic acid, an alcoholic solution of chloroplatinic acid, and complexes of chloroplatinic acid with various kinds of olefins or vinylsiloxanes. The catalyst is used in a catalytic amount which typically ranges from 1 to 1,000 ppm, as platinum metal, based on weight of the component (i).

In addition to the aforesaid components, the coating agent may contain optional components such as a retarder to suppress catalytic activity of the platinum metal catalyst, for example, organic nitrogen compounds, organic phosphorous compounds, organic silicon compounds, acetylene compounds, and oxime compounds. Preferably, an acetylene compound such as 3-methyl-1-butyn-3-ol, a silylated compound thereof, or a silicon compound such as divinylcyclotetrasiloxane is used. The retarder is contained in the agent preferably in an amount of from 0.05 to 3 parts by weight per 100 parts by weight of the component (i). A retarder in an amount below the aforesaid lower limit may cause the coating agent to gel, whereas more than 3 parts by weight of the retarder will hinder curing.

EXAMPLES

The present invention is explained with reference to the following examples, but not limited thereto.

Preparation of a Fluorine-Containing Silicone Coating Agent

A fluorine-containing silicone coating agent was prepared by mixing an organosiloxane of the following formula (I) having alkenyl groups and fluorinated groups with an organohydrogenpolysiloxane of the following formula (II) in such a mixing ratio that a molar ratio of SiH bonds of organohydrogenpolysiloxane(II) to vinyl groups of organosiloxane(I) was 2.5. To 100 parts by weight of the mixture obtained, 0.6 parts by weight of 3-methyl-1-butyn-3-ol and 30 ppm, as platinum metal, of a chloroplatinic acid complex with a vinylsiloxane were added.

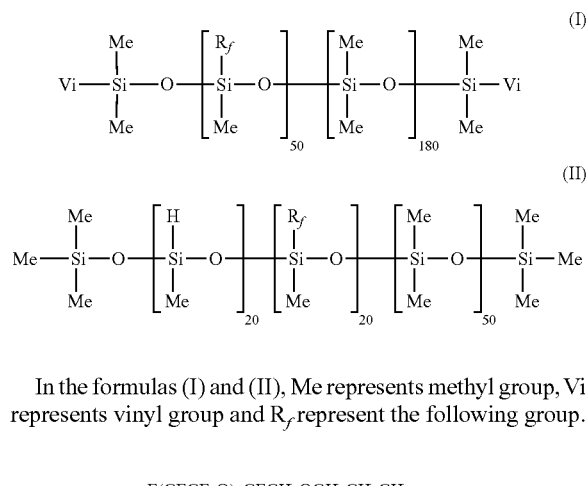

In the formulas (I) and (II), Me represents methyl group, Vi represents vinyl group and $R_f$ represent the following group.

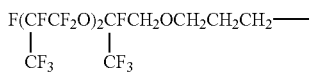

Examples 1 to 6, Comparative Examples 1 and 2

The aforesaid fluorine-containing silicone coating agent was diluted with the diluents as listed in Table 1 so as to make a concentration of the agent, as solid content, 5%. The fluorine-containing silicone coating compositions thus prepared were evaluated according to the following methods. The results are as shown in Table 1.

(a) Surface of Coating

Each of the coating compositions was applied on a 38 μm-thick PET film in an amount of 0.5 g/m² with a wire bar coater No. 7. The applied compositions were heated at 150° C. for 60 seconds. A surface of the release layer thus obtained was visually observed, and rated according to the following criteria:

A: No defects such as craters and fish-eyes
B: less than 3 defects/m²
C: 3 to 5 defects/m²
D: 6 or more defects/m²

(b) Release Force of a Pressure-Sensitive Tape

On each release coating layer prepared in the test (a), a 19 mm-wide silicone pressure-sensitive adhesive tape, Nitoflon No. 903UL, ex Nitto Denko Co., was stuck. The release film and the pressure-sensitive adhesive tape thereon were aged under a load of 25 g/cm² at 25° C. for 20 hours or 70° C. for 20 hours. Release force (N/19 mm) at 180 degree angle of the pressure-sensitive adhesive tape was measured at a peeling rate of 0.3 m/min with a tensile tester.

(c) Subsequent Adhesion Strength

On each release coating layer prepared in the test (a), a pressure-sensitive adhesive tape as used in the test (b) was stuck and aged under a load of 25 g/cm² at 70° C. for 20 hours. Subsequently, the pressure-sensitive adhesive tape was peeled off, and then stuck to a stainless steel (SUS) plate. Release force of the tape (F1 in N/19 mm) was measured in the same manner as above. As a blank test, release force of a virgin pressure-sensitive tape (F0 in N/19 mm) stuck to a SUS plate was measured in the same manner as above. Retention of the peel adhesion strength (%) was calculated according to the following equation:

$$\text{Subsequent adhesion strength}(\%) = F1/F0 \times 100$$

TABLE 1

| | Diluent | Surface | Release force (N/19 mm) 25° C. | Release force (N/19 mm) 70° C. | Subsequent adhesion strength (%) |
|---|---|---|---|---|---|
| Example 1 | PFO/HFMX/IPE 20/10/70 | A | 0.04 | 0.09 | 98 |
| Example 2 | EFL-102/HFMX/IPE 10/5/85 | A | 0.03 | 0.08 | 99 |
| Example 3 | EFL-102/IPE 5/95 | B | 0.05 | 0.10 | 98 |
| Example 4 | EFL-102/IPE 20/80 | A | 0.04 | 0.08 | 98 |
| Example 5 | HFMX/HX 20/80 | A | 0.04 | 0.07 | 99 |
| Example 6 | HFMX/IPE 20/80 | A | 0.03 | 0.07 | 98 |
| Comparative Example 1 | PFH/IPE 20/80 | C | 0.15 | 0.36 | 96 |
| Comparative Example 2 | HX/IPE 50/50 | D | 0.27 | 0.62 | 95 |

PFO: Perfluorooctane having a boiling point of 100° C.
EFL-102: Perfluoro-2-butyltetrahydrofuran having a boiling point of 102° C., ex JECO Inc.
HFMX: Hexafluoromethaxylene having a boiling point of 112° C.
PFH: Perfluorohexane having a boiling point of 56° C.
IPE: Diisopropyl ether having a boiling point of 68° C.
HX: Hexane having a boiling point of 69° C.

As can be seen from Table 1, the diluent of the present invention enables one to apply the fluorine-containing silicone coating agent uniformly to form a release coating layer which has no defects and retain at least 98% of peel adhesion strength of a fluorine-containing silicone adhesive.

The invention claimed is:
1. A fluorine-containing silicone coating composition, said composition comprising:
a fluorine-containing silicone coating agent which comprises:
(i) a fluorine-containing organosiloxane represented by the following formula:

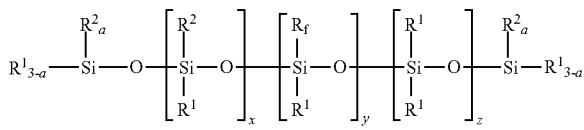

wherein $R^1$ is a non-substituted or substituted monovalent hydrocarbon group having 1 to 10 carbon atoms except aliphatic unsaturated groups, $R^2$ is an alkenyl group having 2 to 10 carbon atoms, a is 1, 2 or 3, x is an integer of 0 or larger, y is an integer of 1 or larger, z is an integer of 0 or larger, and $R_f$ is at least one group selected from the groups represented by the following formulas (1) to (4):

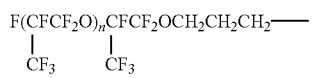  (1)

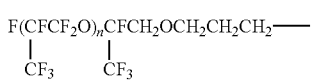  (2)

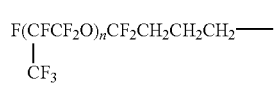  (3)

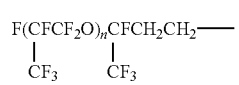  (4)

wherein n is an integer of from 1 to 5,
which contains 20 to 40 wt % of fluorine atoms, based on weight of the organosiloxane,
(ii) an organohydrogenpolysiloxane having at least three SiH bonds per molecule, and
(iii) a catalyst comprising a platinum group metal and a diluent which comprises:
(A) at least one member selected from the group consisting of diisopropyl ether and hexane, and
(B) a fluorinated solvent having a boiling point, at atmospheric pressure, which is higher than that of the component (A) by at least 30° C. and is 180° C. or lower,
with a weight ratio of the component (A) to the component (B) ranging from 85/15 to 65/35 such that a coating layer formed from the composition is uniform in thickness and has no defects,
wherein the organohydrogenopolysiloxane (ii) is represented by the following formula:

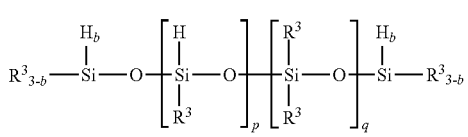

wherein $R^3$ is at least one selected from the group defined above for $R^1$ and $R_f$, b is 0 or 1, p is an integer of 1 or larger, and q is an integer of 0 or larger, provided that p+2b is 3 or larger.

2. The fluorine-containing silicone coating composition according to claim 1, wherein the diluent is contained in an amount of from 80 to 99 wt %, based on weight of the composition.

3. The fluorine-containing silicone coating composition according to claim 1, wherein the fluorinated solvent (B) is at least one member selected from the group consisting of perfluorooctane, perfluoro-2-butyltetrahydrofuran and hexafluoroxylene.

4. The fluorine-containing silicone coating composition according to claim 1, wherein the fluorine-containing silicone coating composition is for use in preparing a release paper.

5. The fluorine-containing silicone coating composition according to claim 4, wherein the release paper is used for a pressure-sensitive silicone adhesive layer.

6. The fluorine-containing silicone coating composition according to claim 1, wherein the fluorine-containing organosiloxane (i) is at least one selected from the group consisting of the following formulas:

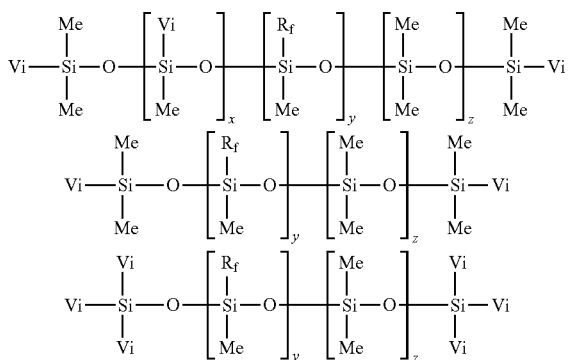

wherein Me represents methyl group, Vi represents vinyl group, and $R_f$, x, y and z are as defined in claim 1.

7. The fluorine-containing silicone coating composition according to claim 1, wherein the organohydrogenpolysiloxane (ii) is at least one selected from the group consisting of the following formulas:

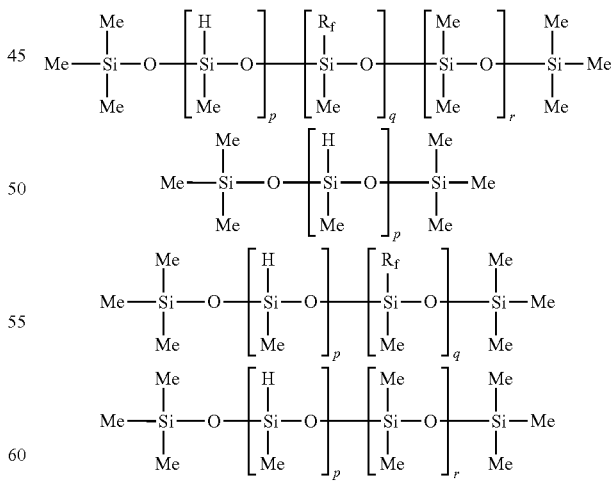

wherein Me, $R_f$, p and q are as defined in claim 1, and r is an integer of 1 or larger.

8. The fluorine-containing silicone coating composition according to claim 1, the fluorine-containing silicone coating agent comprises a retarder.

9. A method of applying a fluorine-containing silicone coating composition to a substrate, said composition comprising:
a fluorine-containing silicone coating agent which comprises:
(i) a fluorine-containing organosiloxane represented by the following formula:

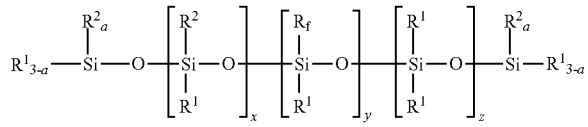

wherein $R^1$ is a non-substituted or substituted monovalent hydrocarbon group having 1 to 10 carbon atoms except aliphatic unsaturated groups, $R^2$ is an alkenyl group having 2 to 10 carbon atoms, a is 1, 2 or 3, x is an integer of 0 or larger, y is an integer of 1 or larger, z is an integer of 0 or larger, and $R_f$ is at least one group selected from the groups represented by the following formulas (1) to (4):

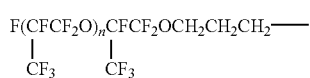

(1)

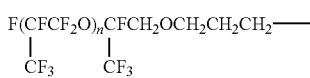

(2)

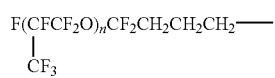

(3)

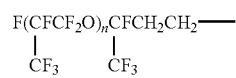

(4)

wherein n is an integer of from 1 to 5,
which contains 20 to 40 wt % of fluorine atoms, based on weight of the organosiloxane,
(ii) an organohydrogenpolysiloxane having at least three SiH bonds per molecule, and
(iii) a catalyst comprising a platinum group metal and
said method comprising the step of adding a diluent to the fluorine-containing silicone coating composition,
said diluent which comprises:
(A) at least one selected from diisopropyl ether and hexane, and
(B) a fluorinated solvent having a boiling point, at atmospheric pressure, which is higher than that of the component (A) by at least 30° C. and is 180° C. or lower, with a weight ratio of the component (A) to the component (B) ranging from 85/15 to 65/35 such that a coating layer formed from the composition is uniform in thickness and has no defects,
wherein the organohydrogenopolysiloxane (ii) is represented by the following formula:

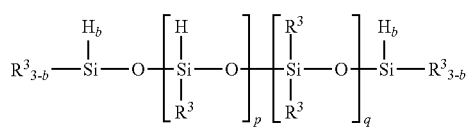

wherein $R^3$ is at least one selected from the group defined above for $R^1$ and $R_f$, b is 0 or 1, p is an integer of 1 or larger, and q is an integer of 0 or larger, provided that p+2b is 3 or larger.

10. The method of applying a fluorine-containing silicone coating composition according to claim 9, wherein the fluorinated solvent (B) is at least one selected from the group consisting of perfluorooctane, perfluoro-2-butyltetrahydrofuran and hexafluoroxylene.

11. The method of applying a fluorine-containing silicone coating composition according to claim 9, wherein the fluorine-containing organosiloxane (i) is at least one selected from the group consisting of the following formulas:

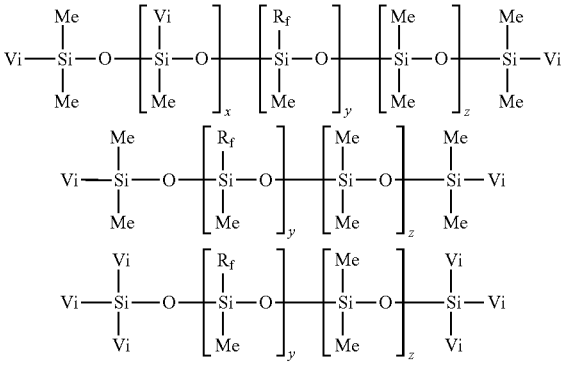

wherein Me represents methyl group, Vi represents vinyl group, and $R_f$, x, y and z are as defined in claim 9.

12. The method of applying a fluorine-containing silicone coating composition according to claim 9, wherein the organohydrogenpolysiloxane (ii) is at least one selected from the group consisting of the following formulas:

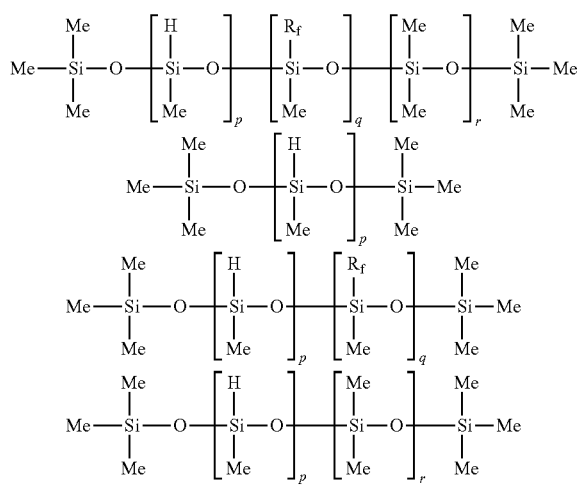

wherein Me, $R_f$, p and q are as defined in claim 9, and r is an integer of 1 or larger.

13. The method of applying a fluorine-containing silicone coating composition according to claim 9, wherein the fluorine-containing silicone coating agent comprises a retarder.

* * * * *